United States Patent [19]
Handly

[11] Patent Number: 5,397,410
[45] Date of Patent: Mar. 14, 1995

[54] METHOD FOR MAKING A MACHINE READABLE BAR CODE ON GLASSWARE AND THE PRODUCT THEREOF

[76] Inventor: Robert A. Handly, 13707 Kingsride, Houston, Tex. 77079

[21] Appl. No.: 34,286

[22] Filed: Mar. 22, 1993

[51] Int. Cl.⁶ .............................................. C03B 32/00
[52] U.S. Cl. ...................... 156/89; 428/323; 428/201; 428/325; 264/60; 264/63; 264/66
[58] Field of Search ............... 156/89; 428/323, 201, 428/325; 264/60, 63, 66

[56] References Cited

U.S. PATENT DOCUMENTS

| | | | |
|---|---|---|---|
| 4,068,033 | 1/1978 | Meade | 428/201 |
| 4,600,630 | 7/1986 | Quinn et al. | 428/203 |
| 4,971,858 | 11/1990 | Yamano | 428/323 |
| 5,008,151 | 4/1991 | Tominaga et al. | 428/343 |
| 5,145,726 | 9/1992 | Sakuramoto et al. | 428/195 |
| 5,204,163 | 4/1993 | Nakatsuka et al. | 428/195 |
| 5,209,796 | 5/1993 | Sakuramoto et al. | 156/89 |
| 5,218,472 | 7/1993 | Jozefowicz et al. | 359/584 |
| 5,264,033 | 11/1993 | Noda et al. | 106/447 |

*Primary Examiner*—W. Gary Jones
*Assistant Examiner*—Mark DeSimone
*Attorney, Agent, or Firm*—Bush, Moseley, Riddle & Jackson

[57] ABSTRACT

A method for making machine readable bar code markings (20) on glassware (10) is disclosed. A ceramic film (16B) first has bar code markings (20) placed thereon. The ceramic film with the bar code markings (20) is placed on the outer surface (14) of the glassware (10). The ceramic film (16) and glassware (10) are heated or fired for a predetermined time period at a temperature over 1100° F. adequate to effect fusing of the film (16B) onto the glassware (10) while providing a fused layer (18) therebetween.

1 Claim, 2 Drawing Sheets

FIG.1
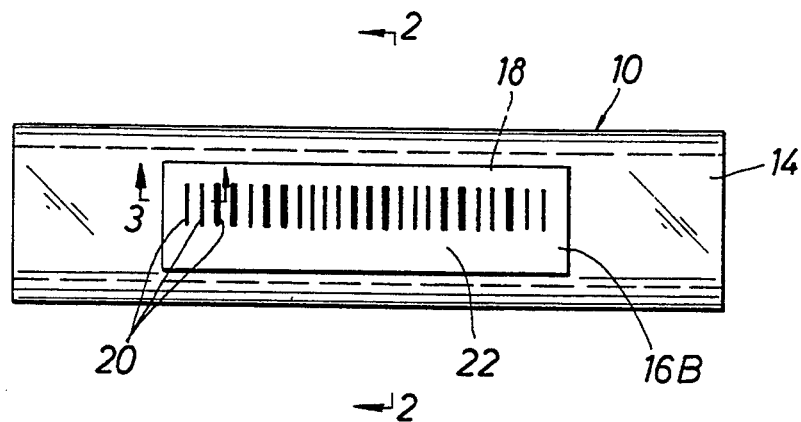
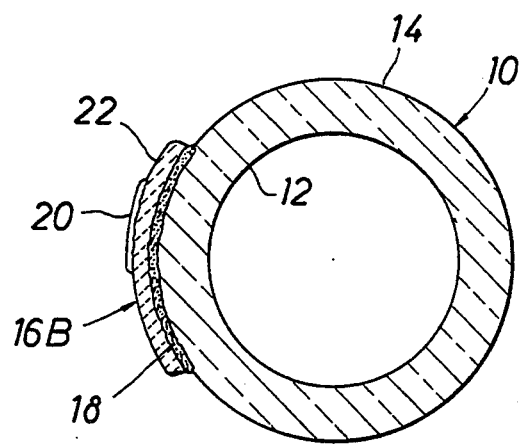
FIG.2
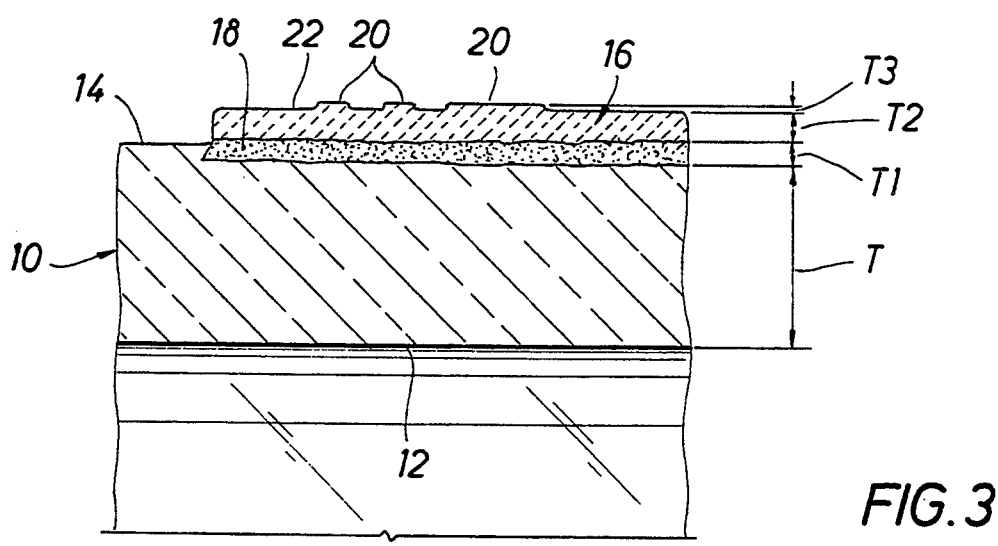
FIG.3

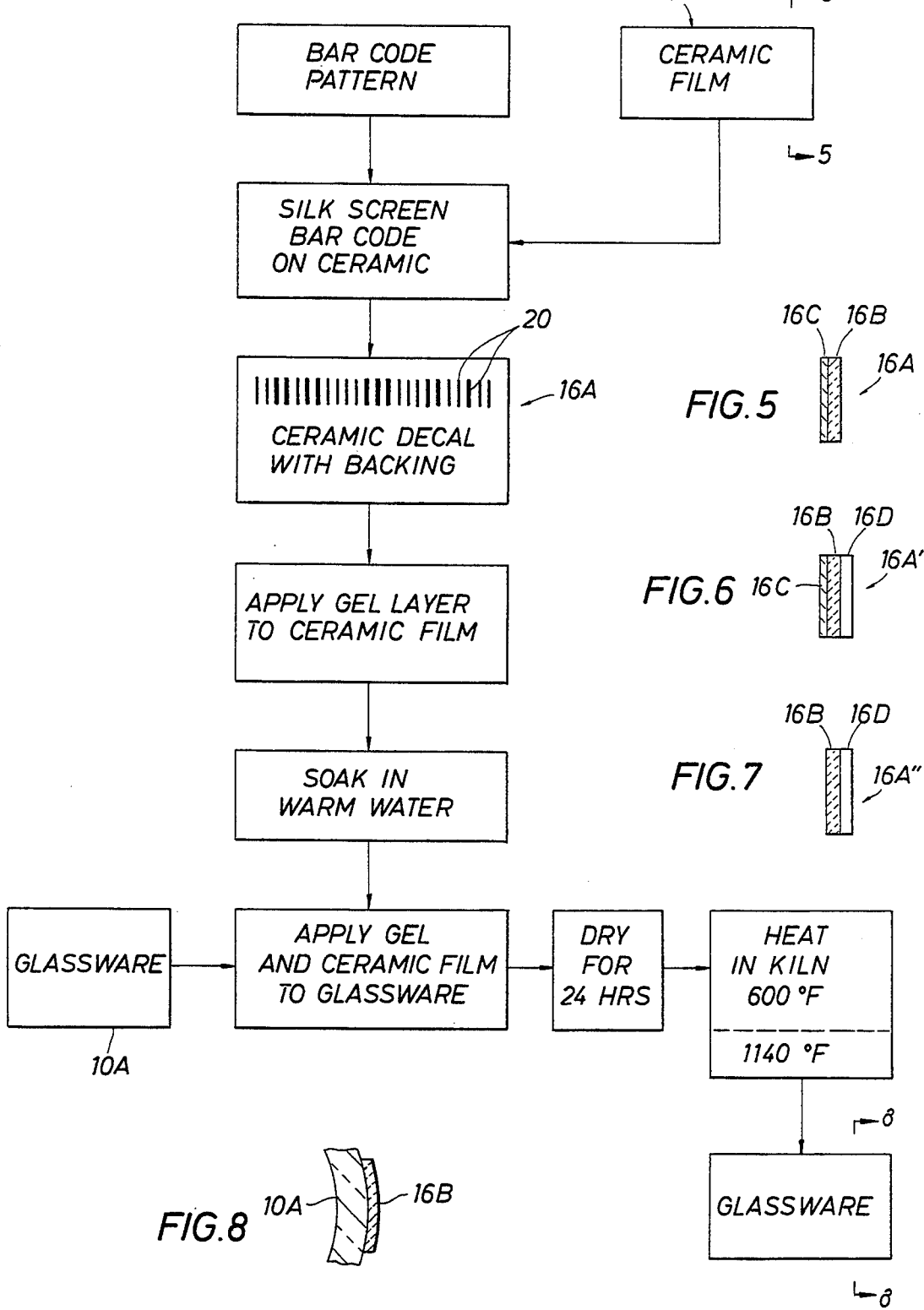

METHOD FOR MAKING A MACHINE READABLE BAR CODE ON GLASSWARE AND THE PRODUCT THEREOF

FIELD OF THE INVENTION

This invention relates to a method for making a machine readable bar code or marking on glassware and the resulting glass product having the bar code thereon for identification of the glassware.

BACKGROUND OF THE INVENTION

Heretofore, machine readable markings have been provided utilizing a related sequence of substantially parallel bars or stripes of predetermined widths and spacings which are commonly referred to as bar code markings. The marking may utilize bars of one-unit and three-unit widths, and spaced therebetween of one-unit and three-unit widths. Bar, codes have been described in detail elsewhere.

Glass is a ceramic material consisting of a generally uniformly dispersed mixture of silica or sand (75%), soda ash (20%), and lime (5%) often combined with such metallic oxides as those of calcium, lead, lithium, cerium, etc. depending on the specific properties desired. The blend is heated to fusion temperature around 700°–800° C. (1292° F.–1472° F.) and then cooled or annealed to a rigid or vitreous state. While bar code markings may be placed anywhere on glass products or glassware, it is important that markings be placed at locations that are easily located and accessible. It is desirable that such bar code marking be permanently secured or integral with the glassware so that the bar code is inseparable from the glassware.

One method utilized heretofore for providing a machine readable bar code marking on glass is shown in U.S. Pat. No. 4,600,630 dated Jul. 15, 1986. The bar code is applied to the glass by first depositing a thin undercoating of light-modulating material on the glass surface, then recessing or etching selected portions through the coating to define the machine readable marking, next integrating the marking into the surface of the glass by baking, and then applying a protective overcoating. Thus, the bar code marking is first etched into the glass surface and then a ceramic glaze overcoats the marking as a protective coating. The undercoating and overcoating when heated or fired are integrated into the main body and become inseparable. Thus, the coating cannot be removed without destroying the coatings. Such a process is relatively complicated utilizing two separate coatings and normally requiring separate heating of the coatings.

SUMMARY OF THE INVENTION

The present invention is directed particularly to a method for making a machine readable bar code on glassware and the resulting glassware product from the method utilizing a decal formed of a ceramic material and having the bar code markings thereon. The predetermined bar code pattern is first applied to the ceramic decal in a silk screen process utilizing a printing ink having a pigment suitable for combining with a ceramic material and providing a permanent color upon oxidation and polymerization of a drying oil or resin in which the pigment is suspended. A silk screen process includes a stencil method for printing the bar code pattern through silk or other fine cloth on which all parts of the design not to be printed have been stopped out by an impermeable film.

A ceramic or ceramic material is a product manufactured by the action of heat on earthy raw materials in which silicon and its oxide and complex compounds known as silicates form a predominate portion. A wide range of ceramic products are manufactured including those made from ultra-fine particles (10–150 microns) and ceramic foams. For coloring ceramic material, naturally occurring minerals have been utilized as well as oxides added to alter color to form ceramic stains. A ceramic color must be capable to withstand a relatively high temperature such as 1200° F. or more reached in a kiln without deterioration. A black color may be obtained by the use of a black iron oxide, for example. Ceramic coloring has been described in detail in various publications and further description is unnecessary here. For example, see Ceramics, Mastering The Craft, chapters 9 and 10 (pages 116–132) published Chilton Book Co., 1990, the entire disclosure of which is incorporated by this reference.

A ceramic decal includes a film of ceramic material with removable strip applied to its rear surface. A gel layer is applied to the front surface of the ceramic material. The backing strip is removed from the rear surface of the ceramic material. The ceramic material and gel layer are then applied to a predetermined surface area of the glassware. After drying of the ceramic material and gel layer, the glassware is placed in a kiln and heated for a predetermined time period to a temperature over about 1100° F. for a time sufficient to fuse the ceramic material to the adjacent contacting glass surface of the glassware. After cooling of the glassware, the ceramic material and its integral bar code marking are essentially inseparable from the glass body and cannot be removed from the glass body without at least a partial destruction of the glass body. The gel layer is burned up or vaporized during the heating step.

A clear color contrast for the bar code is provided with respect to the background color of the ceramic material. The bar code is an integral inseparable part of the ceramic material, which after heating is fused to the glassware. The bar code markings are machine readable by an optical scanner for a digital encoding of the identification and storage in a computer.

It is an object of this invention to provide a method for making a machine readable bar code on glassware and the resulting glassware product from the method while using bar code markings applied to a ceramic film.

It is a further object of this invention to provide such a method for glassware in which a decal formed of a ceramic material having the bar code markings thereon is first formed, and then is positioned on glassware for fusing with the glass upon heating or firing at predetermined temperatures for predetermined periods of time sufficient for such fusing.

Other objects, features and advantages of this invention will become more apparent after referring to the following specification and drawings.

BRIEF DESCRIPTION OF THE DRAWINGS

FIG. 1 is a side elevation of a tubular glass article having the ceramic decal fused thereon and including bar code markings;

FIG. 2 is an enlarged cross section of the tubular glass product taken along lines 2—2 of FIG. 1 and showing the fused decal thereon;

FIG. 3 is an enlarged longitudinal section taken along lines 3—3 of FIG. 1;

FIG. 4 is a schematic flow chart of the method used in forming a ceramic film with bar code markings thereon and a gel coating applied to its front surface and in fusing the ceramic film with bar code markings to the glassware;

FIG. 5 is a section taken along line 5—5 of the ceramic film of FIG. 4 and showing the ceramic film with a backing strip thereon prior to placing the bar code on the film.

FIG. 6 is a cross section illustration of the structure including backing strip, ceramic film and gel coating;

FIG. 7 is a cross section illustrating the ceramic film and gel coating after the backing strip has been removed; and FIG. 8 is a cross section illustrating the ceramic film fused to glassware.

DESCRIPTION OF THE INVENTION

Referring to the drawings, glassware generally indicated at 10 comprises a tubular glass product having an inner peripheral surface 12 and an outer peripheral surface 14. (The invention is described by reference to tubular glassware, but ceramic decals with bar codes on them according to the invention may be used to apply bar codes to a wide variety of glassware). A ceramic decal 16 having an integral bar code marking 20 thereon is fused onto outer surface 14 along a fused layer 18 to become an integral, inseparable part of glass product 10 and provide a bar code which may be machine read by means of an optical scanner for digital encoding the identification of glassware 10.

The method for first making the machine readable bar code on a ceramic film, and then fusing the ceramic film on glassware is illustrated schematically in FIG. 4. A ceramic film blank 16A as shown schematically in FIG. 5 is provided. Such ceramic film blank includes a flexible ceramic film 16B and a removable backing strip 16C attached thereto. Ceramic film blank 16A is a thickness of about 0.016 inch and includes a ceramic film 16B and a backing strip 16C applied to the rear of ceramic film 16B. Backing strip 16C may be a waxed paper or cardboard material. A predetermined bar code pattern, established for identification of the glassware, is applied with a silk screen stencil to the outer surface of ceramic film 16B. The printing ink used in the silk screen process for application of the bar code is ceramic ink. The bar code markings including a plurality of bars 20 of a predetermined width with each bar spaced a predetermined distance from adjacent bars 20. Bar 20, as shown in FIG. 2, projects from the outer surface of ceramic film 16B. Next, as shown in FIG. 2, a gel layer is applied to the ceramic film 16B as indicated in FIG. 6. The entire structure 16A' now includes ceramic film 16B, gel layer, and 16D backing layer 16C.

To remove backing strip 16C (see FIGS. 4 and 7) from structure 16A', such structure is soaked in warm water of a temperature about 90° F. for about 5 minutes. Backing strip 16C may be manually removed and discarded. Ceramic film 16B with its bar code and gel 16B is depicted in FIG. 7 as structure 16A". Such structure is then placed on blank glassware 10A along its arcuate outer surface 14 (FIG. 2).

After structure 16A" is applied to the outer surface 14 of glassware 10, the glassware 10 and structure 16A" are dried for a period of about 24 hours at an ambient temperature of about 70° F. Then, the glassware 10A with structure 16A" is placed in a kiln for firing or heating to a first temperature of 600° F. which is maintained for about 10 minutes. Next, the temperature is increased to about 1140° F. and then cooled to provide the final glass product. A fused layer 18 (FIG. 2) of the ceramic decal 16B and combined glassware 10 is formed. The gel layer 16D is burned off in the heating stage. While a two stage heating cycle is preferred, various heating cycles may be satisfactorily employed. However, it is necessary to heat or fire the ceramic film 16B and adjacent contacting surface 14 of glassware 10 to a temperature for a time adequate to provide fusing of the ceramic decal 16D and adjacent glass surface 14 so that ceramic decal 16B is an integral inseparable part of the glassware.

As an example and referring to FIG. 3, glassware 10 may have a thickness T of about 0.86 and 1.0 mm; fused layer 18 a thickness T1 of 0.025 mm; ceramic film 16B adjacent the fused layer 18 a thickness T2 of about 0.04 mm, and markings 20 projecting a distance T3 of about 0.05 mm from the adjacent outer surface 22 of ceramic film 16B. Glass normally fuses at temperatures between around 1290° F. to 1470° F. Thus, the ceramic film 16B cannot be removed from the glass body 10 without at least a partial destruction of the glass body 10. Coded, machine readable bar code markings are referred to herein. The novel method using a ceramic film positioned thereon may be used with any bar indicia marking, coded or uncoded, machine readable and/or human readable.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A method of applying a bar code pattern to glassware comprising the steps of
   creating a bar code pattern;
   providing a ceramic film blank having a ceramic layer and a removable backing strip applied to its rear surface;
   applying said bar code pattern with a silk screen process onto said ceramic layer;
   applying a gel coating to a front surface of said film blank to create a bar code decal structure;
   soaking said bar code decal structure in water at about 90° F. for about five minutes;
   manually removing said backing strip to result in a structure including ceramic film layer and said gel coating;
   placing said structure on blank glassware;
   drying said glassware and said structure for a period of about 24 hours at an ambient temperature of about 70° F. to create a dried structure;
   placing said dried structure in a kiln for heating to a temperature of about 600° F. for a period of about ten minutes, and then
   increasing the temperature of said dried structure to about 1140° F. for a predetermined time period for fusing of the ceramic decal and glassware while said gel coating is vaporized.

* * * * *